US00H002275H

(19) United States
(12) Statutory Invention Registration
Burgin

(10) Reg. No.: US H2275 H
(43) Published: Jun. 4, 2013

(54) METHOD OF APPLYING CARBON NANOTUBE FILMS TO PLASTIC SUBSTRATES

(75) Inventor: Timothy P. Burgin, Mechanicsville, VA (US)

(73) Assignee: The United States of America, as represented by the Secretary of the Navy, Washington, DC (US)

(21) Appl. No.: 13/199,959

(22) Filed: Sep. 12, 2011

(51) Int. Cl.

| | |
|---|---|
| ***B05D 3/02*** | (2006.01) |
| ***B05D 1/36*** | (2006.01) |
| ***B05D 1/02*** | (2006.01) |
| ***B05D 1/18*** | (2006.01) |
| ***B82Y 40/00*** | (2006.01) |

(52) U.S. Cl. ..... 427/458; 427/372.2; 427/430.1; 427/421.1; 977/892

(58) Field of Classification Search ..... 427/458, 427/372.2, 430.1, 421.1; 977/892
See application file for complete search history.

(56) References Cited

U.S. PATENT DOCUMENTS

2009/0263656 A1 * 10/2009 Chae et al. ..... 428/400
2010/0044074 A1 * 2/2010 Kim et al. ..... 174/126.2
2010/0279095 A1 * 11/2010 Li et al. ..... 428/220
2011/0281105 A1 * 11/2011 Campazzi et al. ..... 428/328

* cited by examiner

*Primary Examiner*—Daniel Pihulic
(74) *Attorney, Agent, or Firm*—Gerhard W. Thielman; Oscar A. Towler, III

(57) ABSTRACT

A method of forming a film of carbon nanotubes on a substrate includes deposition a solution of electrically charged carbon nanotubes on the surface of a substrate, adsorption of the electrically charged carbon nanotubes onto a surface the substrate of opposite electrical charge through dip coating, using a material with a surface electrical charge opposite to that of the electrically charged carbon nanotubes, and formation of a film of carbon nanotubes on the substrate, wherein the film comprises a plurality of electrically charged nanotubes extending in varying orientations but parallel to a facing surface of the substrate.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF APPLYING CARBON NANOTUBE FILMS TO PLASTIC SUBSTRATES

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

TECHNICAL FIELD

Embodiments of this disclosure relate to a method of forming a carbon nanotube (CNT) film on substrates of different geometry of an electrically conducting thin film of carbon nanotubes (CNTs), based on electrostatic adsorption from aqueous nanotube suspensions. Specifically, the disclosure describes a method of deposition of CNTs onto plastic surfaces.

BACKGROUND OF THE DISCLOSURE

A wide range of plastic surfaces can be chemically modified such that they acquire a charge when exposed to water through chemical modification of their surfaces. These charged surfaces efficiently adsorb a self-limiting film of CNTs over a period of a few seconds from aqueous suspensions of the nanotubes. Since chemical modification of the carbon nanotubes is unnecessary, the intrinsic properties of the tubes remain intact.

CNTs may be deposited onto surfaces by spraying either an aqueous or organic liquid suspension using an atomizer. Using this technology, the uniformity as well as the surface concentration of the CNTs may be difficult to control. In addition, the use of a binder is required to irreversibly attach the CNTs to the surface. Further, aerosolization of CNTs poses potential inhalation health risks. Other deposition methods applicable to the preparation of CNT films on plastic substrates have been studied, but they either require transfer of a pre-made film or chemical modification of the CNTs, which limits the scope of their application. See, e.g., Burgin, T. P. et al.; *Langmuir,* 2005, 21 (14), pp 6596-6602; Liu, J. et al.; *Chemical Physics Letters,* 1999, 303, pp 125-129; Swager, T. M. et al.; *Advanced Materials,* 2008, 20, pp 4433-4437; and Gruner, G.; *Journal of Materials Chemistry,* 2006, 16, pp 3533-3539.

In the present disclosure, the method overcomes the above-mentioned CNT film deposition drawbacks, in which the ability to prepare conducting films provides for applications in smart fabrics, foldable antennas, embedded sensors, and other applications. In addition, the high thermal conductivity of the CNTs may be leveraged to produce fabrics that may be used to cool a soldier's body in situations where it is difficult for them to maintain their body temperature, i.e., while wearing MOPP (Mission Oriented Protective Posture) gear. The deposited CNT films may also be used to render plastic parts conductive for electromagnetic shielding and other applications. Further, additional processing of the CNT coated fibers may be used to prepare a variety of plastic based materials, including as conducting plastics.

Accordingly, the present disclosure relates to an improved method, which includes forming a thin film of CNTs on the surface of substrates, based on electrostatic adsorption from aqueous nanotube suspensions.

SUMMARY OF THE DISCLOSURE

In accordance with an embodiment of the disclosure, the method includes a series of steps for forming a thin film of CNTs on the surface of substrates, which include:

deposition of a solution of electrically charged carbon nanotubes on the surface of a substrate, adsorption of the electrically charged carbon nanotubes onto the surface of a substrate of opposite electrical charge through dip coating, and formation of a film of carbon nanotubes on the substrate, wherein the film comprises a plurality of electrically charged nanotubes extending in varying orientations but parallel to a facing surface of the substrate.

In another embodiment of the disclosure, the method includes forming the film on the surface of a plastic substrate.

Other embodiments of the method include adsorbing the solution onto aminopropyl siloxane functionalized amorphous silicon dioxide.

DETAILED DESCRIPTION OF THE DISCLOSURE

A more complete appreciation of the disclosure and many of the attendant advantages will be readily obtained, as the same becomes better understood by reference to the following detailed description when considered in connection with the accompanying drawings.

A method of deposition of CNTs onto the surface of substrates is described, which includes plastic substrates. Since the CNTs are electrically charged, films may be prepared by adsorption of the CNTs onto a surface of opposite charge through a dip coating or a spray and rinse procedure using a material with a surface charge opposite to that of the CNTs.

The surface concentration of the CNTs can be controlled by changing the concentration of the deposition suspension. The upper practical limit is determined by the maximum suspension concentration, which depends on the surfactant being used, typically 0.1-10 mg/mL. The surface concentration of CNTs deposited in the film presumably relates to the charge density on the CNTs in a non-linear way, but, this is as yet unconfirmed empirically. Changes in contact times above a few seconds do not affect the surface concentration. The depositions have been conducted at room temperature, and thus effect of temperature on concentration remains undetermined. This technique has been demonstrated on CNTs from 0.7-9 nm diameter. As the deposition depends on surface charge, direct relationship to tube diameter is not expected. For highly pure CNTs, the charge density on the tube is expected to relate to the electrical band-gap of the CNTs. However, all bulk prepared CNTs that were studied to develop these embodiments have charges or charge densities that are dominated by adsorbed impurities.

In one embodiment, the necessary surface charge for absorption of the CNTs may be generated though modification of the surface with a chemical moiety that is ionized under the deposition conditions. In another embodiment, the surface functionalization may be achieved either through chemical modification of the substrate's surface of the native material or through the deposition of another material, such as a polymer, onto the surface. This technique has been demonstrated with materials, which include silicon dioxide, through the formation of a self-assembled monolayer of aminopropylsiloxane (APS) that provides the surface charge necessary for adsorption of the CNTs. Without functionalization, virtually no CNT adsorption takes place while the APS functionalized surfaces rapidly absorb a self-limiting film of CNTs. However, this technology is not readily transferable to other materials as the surface functionalization is specific to silicon dioxide.

Figure 1A:
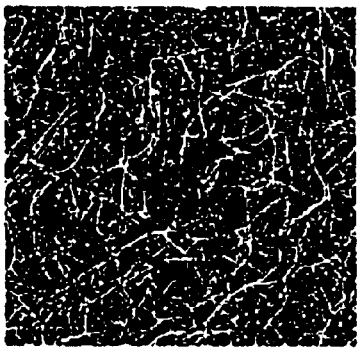
FIGS. 1A and 1B illustrate adsorption of CNTs onto a) aminopropyl siloxane functionalized amorphous silicon dioxide, and b) bare amorphous silicon dioxide surfaces after soaking in a 0.1 mg/mL suspension of SWCNTs in 1% aqueous Triton X-100 for 1 minute.
Figure 1B:
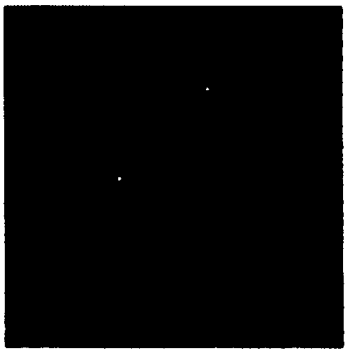

Turning now to FIGS. 1A and 1B, adsorption of CNTs occurs onto aminopropyl siloxane functionalized amorphous silicon dioxide (a) after soaking in a 0.1 mg/mL suspension of single wall CNTs (SWCNTs) in 1% aqueous Triton X-100 for 1 minute, while bare amorphous silicon dioxide surfaces (b) show no absorption.

Figure 2A:
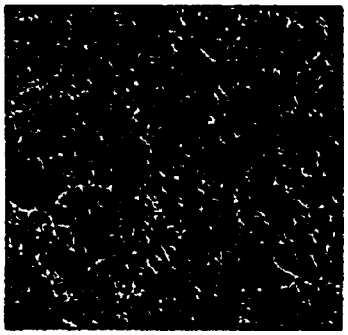
FIGS. 2A and 2B illustrate the adsorption of CNTs onto polystyrene with (a) and without (b) an alkylated poly (ethyleneimine) thin film, according to embodiments of the present disclosure.
Figure 2B:
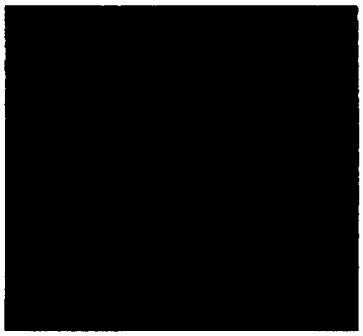

Embodiments of the disclosure may provide a simple means of functionalizing the surface of plastics with a polymer that generates a surtface charge opposite to the charge on the CNTs, and causes the spontaneous formation of a CNT thin film when exposed to a CNT suspension. The concept is demonstrated by using an alkylated poly (ethyleneimine) (PEI) thin film as the gettering layer for CNT adsorption, as shown by FIGS. 2A and 2B. The PEI film may also be cross-linked using a diazide or similar reagent to improve its mechanical robustness and chemical resistance. In addition, in other embodiments, the film can be deposited using the same techniques used to deposit the CNT films, including but not limited to dip coating and spraying, enabling a simple, low cost process.

In another embodiment, when the film is deposited, pre-grown nanotubes may be used. For example, nanotubes may be suspended in a solvent in a soluble or insoluble form, in which arrangement of the film may be one or more nanotubes thick. The carbon nanotubes may also be deposited by dipping the substrate in a solution of soluble or suspended nanotubes.

Further, the deposition may include forming a patterned film of carbon nanotubes. Specifically, in a preferred embodiment, when the carbon nanotube film is provided over a surface of a substrate, the film is patterned.

In a typical process, the surface of the substrate is immersed in a solution of about 1 to about 100 mg/mL of alkylated poly(ethylene imine) in hexanol and allowed to dry. The surface is then immersed in a suspension of about 0.1 to about 10 mg/mL CNT in a liquid such as water, rinsed, and allowed to dry. The resulting films may be nearly transparent, and may be comprised of interconnected CNTs that form a two-dimensional conducting network.

The polymer films that we have prepared are 10-20 nm thick. Films above a threshold thickness (unknown) should not change the total amount of CNTs absorbed. The average thickness of the subsequently adsorbed CNT films can range from approximately 1-200 nm.

In view of the above disclosure, the method of the disclosure demonstrates the transfer of this adsorption methodology to plastic surfaces. The described method is low cost, simple to implement, and applicable to a broad range of materials, including but not limited to plastics of different shape. In addition, the films formed from the method may be used to render plastic parts conductive for electromagnetic shielding and other applications.

Obviously, numerous modifications and variations of the disclosure are possible in light of the above disclosure. It is therefore understood that within the scope of the appended claims, the disclosure may be practiced otherwise than as specifically described herein.

What is claimed is:

1. A method of forming a film of carbon nanotubes on a polymer substrate, comprising:

preparing a solution of carbon nanotubes having a first electrical charge, depositing the solution on a surface of the substrate, the surface having a second electrical charge opposite to the first electrical charge, wherein the carbon nanotubes adsorb onto the surface of the substrate, and forming a film of carbon nanotubes on the substrate, wherein the film comprises a plurality of electrically charged nanotubes extending in varying orientations parallel to the surface of the substrate.

2. The method according to claim 1, wherein the plastic substrate is alkylated poly(ethyleneimine).

3. The method according to claim 1, wherein the depositing comprises one of dip coating, spraying, painting, and wiping.

4. The method according to claim 1, wherein the surface of the substrate is immersed in a solution of about 1 to about 100 mg/mL of alkylated poly(ethylene imine) in hexanol and dried.

5. The method according to claim 1, wherein the film comprises interconnected carbon nanotubes that form a two-dimensional conducting network.

6. The method according to claim 1, wherein the film has controlled density.

7. The method according to claim 1, wherein the film is substantially a monolayer of carbon nanotubes.

8. The method according to claim 1, wherein the depositing forms a patterned film of carbon nanotubes.

9. The method according to claim 1, wherein the substrate is any geometrical shape.

* * * * *